Figure 1:
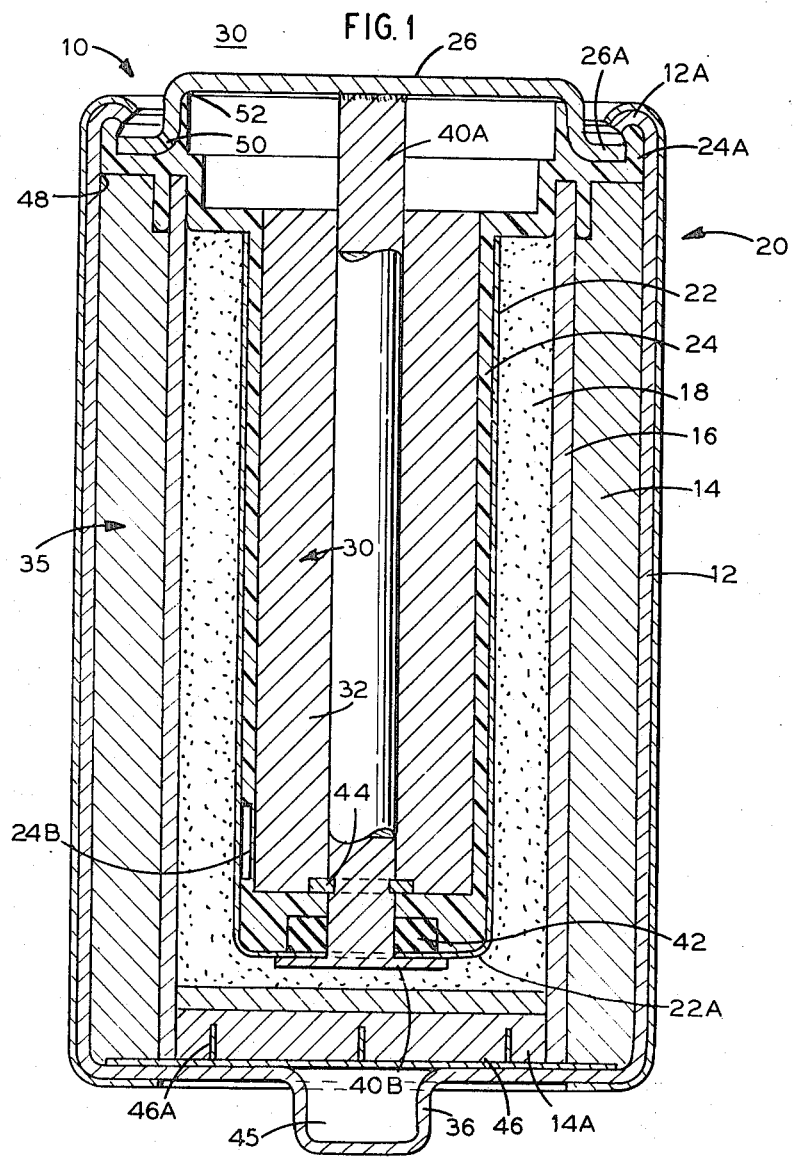

United States Patent [19]
Zaleski

[11] 3,787,243
[45] Jan. 22, 1974

[54] ENERGY CELL
[75] Inventor: John Zaleski, Pleasantville, N.Y.
[73] Assignee: P. R. Mallory & Co., Inc., Indianapolis, Ind.
[22] Filed: May 8, 1972
[21] Appl. No.: 255,881

[52] U.S. Cl.................. 136/107, 136/178, 136/179
[51] Int. Cl. ........................................ H01m 1/06
[58] Field of Search .... 136/107, 133, 178, 179, 177

[56] References Cited
UNITED STATES PATENTS

| | | | |
|---|---|---|---|
| 3,415,690 | 12/1968 | Richman | 136/133 |
| 3,262,819 | 7/1966 | Belove | 136/133 |
| 2,482,514 | 9/1949 | Ruben | 136/179 |
| 3,256,117 | 6/1966 | Howatt et al. | 136/178 |
| 3,318,737 | 5/1967 | Watanabe et al. | 136/133 |
| 3,355,329 | 11/1967 | Wilke et al. | 136/178 |
| 3,530,496 | 9/1970 | Amano et al. | 136/107 |

*Primary Examiner*—Donald L. Walton
*Attorney, Agent, or Firm*—Robert Levine

[57] ABSTRACT

An electric cell having a hermetic pressure seal, and subject to development of high internal gas pressure in the normal operating region, and provided with an auxiliary venting region at atmospheric pressure separated from the operating region with a frangible disc in a separating wall between operating and venting regions with cotton flock in the venting region to retard any high pressure gas and electrolyte injected after fracture of the disc by high pressure in operating region.

17 Claims, 2 Drawing Figures

PATENTED JAN 22 1974　　　　　　　　　　3,787,243

ENERGY CELL

This invention relates to electric energy cells, and is particularly directed to a design and construction to relieve destructive internal pressures that may be developed in the cells during operation.

In the mercury type cells, which have been developed for relatively large energy capacities, in relation to the volumetric dimensions of the cell, the relatively increased activity density in such cells has created a problem, because of the generation of gases during operation of the cell, and because of the limited space available in the cell to accommodate such gases within acceptable pressures that are not harmful to the structure of the cell or to the individual components within the cell. The resulting excessive pressures are harmful.

An additional problem that arises, as a by-product of the generation of excessive pressure within the cell, is the resultant tendency of such excessive pressure to cause leakage of the electrolyte from the cell. As a consequence, after periodic use, and the resultant breathing of the cell, that is, intake of external air during rest periods, after periods of activity in the cell, together with expulsions of electrolyte from the cell, upon recurring high pressures, the cell suffers deterioration and reduction of its operating life, to much less than its normal life should be with the volume of the cell material originally available in the cell structure.

The object of this invention is to provide a novel and effective cell design and construction, in which the cell has a usual operating compartment, and in accordance with this invention is provided with an auxiliary chamber, into which gases may be diverted when they reach excessive pressure.

Another object of the invention is to limit movement of any leaking electrolyte to only such auxiliary chamber, when the internal gas exceeds a predetermined pressure.

Another object of the invention is to provide means in the auxiliary chamber, in the diverted path of the pressure gas and leaking electrolyte, that will absorb the energy of momentum of the gas and of the electrolyte, and thus reduce both to a static condition in the auxiliary chamber.

Another object is to provide the auxiliary chamber in a relatively non-operative region of the cell, so that the energy of the high-pressure gases and of the projected electrolyte may be spent, without creating any ill effects upon the working components of the cell in the normally operating region of the cell.

Another object of the invention, — when applied to an electric cell utilizing an electrolyte and having a hermetic seal to and through which the electrolyte might move in random paths under pressure of internal gas pressure —, is to provide means within the cell for establishing a specific path of movement of the electrolyte, away from such seal, in response to excessive internal gas pressure.

Another object of the invention, in connection with an electric cell which utilizes an electrolyte, with a hermetic seal representing a possible region for leakage of the electrolyte, is to provide a zone having a controlled path wherein movement of the electrolyte may be directed away from the seal.

In accordance with this invention, the electric cell is subdivided into two regions, (1) the main region, which contains the operative elements of the cell, such as the anode material, the cathode depolarizer material, and an electrolyte, with a suitable absorbent barrier to serve as a spacer and to provide additional space for the operating electrolyte; and (2) the second or auxiliary pressure-relieving region, which is provided to receive some of the gases generated to excessive pressure during operation, and to receive any displaced operating electrolyte when the excess pressure gases move into the auxiliary region. The two regions are normally isolated from each other and the high pressure gases and the electrolyte are normally excluded from the auxiliary pressure-relieving region, and enter that region only when the pressure of the generated gas becomes excessive, to a point that would be injurious to the construction and operation of the components of the cell, if such pressure were maintained or exceeded.

According to this invention, when such excessive pressure is developed in the cell, a suitable transfer passage is opened between the working region and the auxiliary region of the cell, to permit the gas at high pressure in the operating region to enter into the auxiliary region, together with an indeterminate quantity of free electrolyte. The excess pressure in the operating region is thus relieved and any electrolyte that may be forced along with such gas movement into the auxiliary region of lower pressure, is held static in said auxiliary region.

Normally the two regions are separated by a plastic wall with a thin-section disc. At a predetermined pressure in the operating region, the pressure ruptures the disc and opens a window to serve as the transfer passage.

The cells to which this invention is herein shown applied, are generally closed and sealed with a specific hermetic sealing structure to prevent leakage, but the excessive pressures, nevertheless, do cause such leakage.

In accordance with this invention, the thin pressure-responsive disc is designed to fracture at a pressure less than the pressure necessary to break through the hermetic seal. Thus, selective pressure control is achieved in fracturing the disc and in directing the high pressure gas into the auxiliary region before the hermetic seal is broken.

To receive the full benefit of this invention, as a further feature of the invention, the space in the auxiliary region is originally filled, in manufacture, with a puffed light-weight material such as cotton flock, which serves to reduce the speed and momentum of any high pressure gas and electrolyte that is forced into the auxiliary chamber, and to absorb the energy of momentum. Then, in addition, the electrolyte is immobilized by the cotton, and is held static in such auxiliary region, where it can do no harm to other parts of the cell, and, further, the electrolyte is also thus immobilized against leakage out through usual sealed regions of the cell, as has been the trouble in conventional cells. In a conventional cell structure, a seal becomes unduly stressed in response to the high gas pressures that have been developed during operation, and some leakage of electrolyte frequently results. The cell appears unsightly, and its ability to function may be affected or unaffected. Its appearance, alone, is not enough to tell its operating condition, but its appearance introduces an ambiguity as to its retained ability to function. Thus, leakage may introduce a psychological apparent defect even if the cell is still sound, and such a cell may be needlessly discarded.

As a final safety feature, the closure seal of the cell may be provided with a final vent hole of minimum dimension, that would be available in case of extreme necessity, to permit the exit of any gas generated in excess of any designed and expected quantity, but, serving nevertheless, to hold such ultimate slow leakage gas velocity to a minimum, due to the barrier effect of the cotton flock, along the controlled path of the movement of such gas to its exit.

In the construction of the cell to provide the main operating region, the usual components of cathode depolarizer material in cylindrical annular form and a concentric cylindrical annular anode, with a separating absorbent barrier between cathode and anode for the electrolyte, are all disposed concentrically within a standard type cylindrical container can; and a central chamber concentric along the axis of the cell is utilized and provided as a longitudinal and generally cylindrical auxiliary pressure-reducing space concentrically within the operating region. Thus, the operating region is disposed circularly within the large arcuate dimensions of the cell, and the auxiliary pressure-reducing safety region is disposed in and along the central axial region of the cell, where the volume of the space thus lost to the operating components is a minimum.

Such auxiliary region along the axis is enclosed in and defined by a cylindrical enclosure disposed between the operating region and the auxiliary space or pressure-relieving region of the cell, to isolate the operating region from such pressure-relieving auxiliary region.

Figure 2:
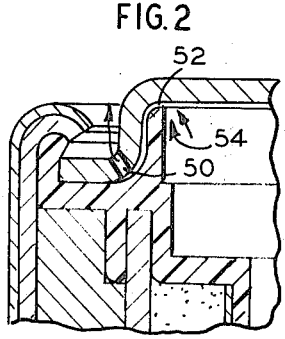

The constructions of one modification of a call embodying this invention is described in the following specification, taken together with the accompanying drawings, in which FIG. 1 is a vertical sectional view of a cell showing the construction features of the invention; and FIG. 2 is a sectional view of a part of the cell at the top seal, to show how pressure gas may leak out through a permitted path and a functionally positioned vent hole.

This invention of cell construction is generally based on solving the problem of preventing leakage of electrolyte from the cell. Such leakage usually occurs in such a way as to create an impression that the cell is defective, even though the cell may be sound. But the condition of the cell is ambiguous and uncertain, for its required use as a battery. Such leakage is usually caused by the generation of gases within the cell, that build up pressure to a value sufficient to break through the intended hermetic seal, and that thus causes leakage at and in the region of the hermetic seal.

Within the philosophy of the invention, the internal structure of the cell is made such as to direct any gases under excess pressure into a space where any electrolyte moving with the gases will be detained and confined within the cell and prevented from moving towards the usual hermetic seal. At the same time, the gases under excess pressure will be guided into said space representing an extended path through which the gases must travel before being vented through a final vent hole provided for that purpose. Thus, no electrolyte is leaked to cast doubt or ambiguity upon the effectiveness or validity of the cell. At the same time, the reduction of the excessive pressures by relief within the cell structure, prevents damage to the elements of the cell which may be susceptible to excessive pressures.

As shown in FIG. 1 of the drawings, a cell 10 comprises: a container can 12 generally formed of nickel plated sheet steel; an annular cathode dopolarizer material structure 14 closely fitting into can 12 with good electrical contact; a cylindrical lining 16 in the cathode depolarizer serving as an absorbent barrier to accept a charge of liquid electrolyte; a quantity of anode material 18 which may be in powder or slurry form; and an anode structure 20 consisting of a cylindrical form having a metallic cylinder 22 and a confined concentric plastic cylinder container 24 provided with an integrally formed head element to serve as a grommet seal for the ultimate sealing of the cell; and a cap seal disc 26 of nickel plated steel for sealing the container can 12 with said integrally formed head element as a grommet seal.

In the anode structure 20, the metallic cylinder 22 and the plastic cylinder 24 are disposed to define a central auxiliary chamber 30 which is concentrically disposed in, but normally isolated and separated from the operating chamber 35. That operating chamber 35 is occupied by the depolarizer material, the absorbent barrier and the anode material or powder. The auxiliary space 30, along the axis, is occupied by the anode structure 20 including the two cylinders 22 and 24. The anode structure 20 is electrically connected to its outer cell terminal 26 that serves as the sealing disc for the cell.

During the normal conditions and normal operation of the cell, any gases which are generated by the interaction of the anode and the cathode materials will be confined to the operating chamber 35 by the structural design of the cell.

The container can 12 is closed at the bottom and is provided with an auxiliary co-axially extending closed hollow box 36 to serve as one polarity terminal for the cell. The upper end of the container can 12 surrounds the circular periphery of a peripheral circular flange 24A that is preferably formed integrally on the cylinder 24, for effective sealing of the operating compartment when the can 12 is peened over at its upper end 12A to engage and press the end of circular flange 24A as a sealing grommet against the annular flange 26A of the upper contact terminal disc 26. When the cell can 12 is thus peened over to engage the peripheral end flange 24A to seal the cell, the main operating chamber 35 is substantially sealed closed to confine all of the operating materials of the anode and the cathode depolarizer material, to that operating chamber between the anode 22 and the cell container can 12.

Upon generation of excessive pressure due to the generation of the internal gases in the operating chamber 35, proper relief of the pressure is necessary to prevent rupture and injury to the cell. To provide such pressure relief, the lower part of the cylindrical wall of the plastic cylinder 24, of anode 22, is provided with a thin wall section 24B to provide a frangible disc area that will be fractured when the gas pressure developed in the operating chamber 35 of the cell reaches or exceeds a predetermined pressure considered to be harmful.

That excessive pressure value is selected to be less than the pressure that could cause leakage at the seal. Thus, relief of excessive pressure in the cell by fracturing the disc to the auxiliary chamber, before leakage pressure develops, preserves the seal and prevents leakage.

The anode structure including the metallic cylinder 22 which engages the anode material 18 is provided with a low-resistance electrical connection to the outer disc terminal 26. For that purpose, a nail 40, having a rod shaped shank 40A and a head 40B of enlarged diameter, serves as the electrical conductor between the anode cylinder 22 and the outer disc terminal 26. Tight pressure is established between the nail head 40B and a radially turned-in annular flange 22A of anode cylinder 22, by a suitable compression rubber sealing element 42 and a snap ring 44 seated in a notched region of the shank 40A under such conditions as to establish originally, and to maintain, a pressure force on the radial flange 22A against the head 40B of the nail 40. The upper or outer end of the nail 40 is suitably spot-welded to the terminal disc 26.

In order to take full advantage of the limited space in a cell of this type that is relatively small in dimension, a space 45 at the bottom of a cell within the sectional area of the absorbent barrier 16 may be filled with an additional depolarizer pellet 14A, formed on a supporting disc 46 of nickel plated steel, similar to the can 12, and provided with expanded fingers 46A to hold the auxiliary depolarizer pellet 14A in place, and to provide additional electrical contact between the auxiliary depolarizer pellet 14A and the can 12.

During operation of the cell, the gases that are formed may generate pressure to a value that may become destructive to the depolarizer material and dentrimentally affect the physical contact and electrical engagement between the depolarizer material and the can. Such pressure could also be effective to move gases up between the can and the grommet seal around the rim 24A, as in conventional structures, which would tend also to force some of the liquid electrolyte out through the sealing region out to the outer surface of the terminal disc. The presence of the elctrolyte creates a psychological doubt about the effectiveness of the cell. Even if the cell were still satisfactory for substantial additional use, the doubt about its validity could lead to its premature discard and unnecessary replacement by another cell.

In accordance with the present invention, the gas under excess pressure is controlled to move along a preselected path, rather than in a random path which the high pressure gas might find most conveniently available. In order to compel such high pressure gas to move in a predetermined path, where some control may be exercised on the gas and on any attendant electrolyte, the small disc area 24B is located at the bottom of the anode structure 20 and is made frangible so that it will fracture at a preselected pressure, when that pressure is reached. The frangible disc 24B is thereupon fractured. Thereupon the high pressure in the operating region 35 causes the high pressure gas to move into the auxiliary chamber 30, within the anode structure 20, where the pressure is atmospheric, whereupon the high pressure in the operating region 35 is relieved and reduced.

In order to absorb the energy of momentum of the high pressure gas and of the electrolyte carried by such high pressure gas into the auxiliary chamber 30, a quantity of loose cotton flock 32 is disposed in the auxiliary chamber 30.

Thus, the provision of the safety disc as a valve has served
1. to relieve the high pressure that would otherwise affect the operation of the cell; and
2. to reduce the velocity of the high pressure gas to zero; and to stop the movement of the electrolyte. The electrolyte is then held confined against further movement, and, particularly, is held from moving to the external seal, where the presence of the electrolyte could establish the psychological ambiguity previously referred to, that would reflect on the operativeness of the cell.

In the absence of the venting chamber 30, a high pressure gas in operating chamber 35 could be effective to tend to leak past the sealing grommet ring 24A, at corner 48, and carry some of the liquid electrolyte with it, to leak under and past the peened-over end 12A of the enclosure can 12. The safety disc 24B fractures before the pressure becomes enough to cause such leakage at corner 48.

With the provision of the additional space within the auxiliary chamber for the high pressure gas to move into, the total pressure of the gas in the cell is reduced to a safe value. The generation of further pressure beyond a further selected value is then prevented by the provision of a final vent hole 50 which is in communication with the upper end of the auxiliary chamber 30. This arrangement of the vent hole 50 to communicate with the upper end of the venting chamber 30, while requiring any excess gas from the operating chamber 35 to enter at the bottom of the venting chamber 30, assures that the cotton flock in the auxiliary chamber will provide the maximum retarding effect on both the excess pressure gas, and any electrolyte carried by the gas.

When the pressure again accumulates, and is present in the auxiliary chamber 30, such pressure can be effected to force gas out past the corner or region 52 at the upper end or corner of the flange ring 24B at the top end of the plastic cylinder 24. Thence the gas can move to the final vent hole 50 to relieve the pressure in the cell, as in FIG. 2.

Thus, by means of the simple provision of the internal auxiliary chamber within the cell, and the disposition of the frangible disc to guide high pressure gas into the relief chamber at its bottom end, at a maximum distance from the sealed end of the cell, any electrolyte that might otherwise be moved by high pressure gas to the sealed end of the cell, is kept within the cell limits and prevented from leaking to the outside to create a false or ambiguous impression of the lack of integrity of the cell.

The invention is not limited to the designed construction of the cell as shown, but may be variously applied according to the designed structure of any cell in which the invention may be utilized, within the spirit and scope of the invention, as set forth in the claims.

What is claimed is:
1. An electric cell comprising:
   a cup-shaped container can;
   a top closure for said container can, said top closure including an anode terminal assembly;
   a space within said container defining an operating region, said operating region comprising an annular region along the major length of the radius of said container, said operating region containing active cell components including a cylindrical annu- lar cathode depolarizing material in electrical contact with the container, a concentric cylindrical anode spaced from said cathode material by a separating absorbent barrier, and a charge of electrolyte within said operating region;

means defining an auxiliary space axially along a minimum inner dimension of the radius, said auxiliary space separated from said operating region; and means constituting a safety rupturable divider between said operating region and said auxiliary space, to enable said auxiliary space to serve as a venting region to receive generated gases or electrolyte, if and when pressure in said operating region becomes excessive.

2. An electric cell, as in claim 1, in which a material is disposed in said auxiliary space to retard and slow-down any gas volume driven into said auxiliary space under pressure from said defined space.

3. An electric cell, as in claim 1, in which a barrier material is disposed in said auxiliary space to immobilize any electrolyte forced into said auxiliary space when said safety divider ruptures.

4. A electric cell, as in claim 1, in which said auxiliary space-defining means is an elongated cylindrical cup disposed co-axially and concentrically within the cell.

5. An electric cell, as in claim 4, in which said auxiliary space-defining means also embodies said means that constitute the safety rupturable divider.

6. An electric cell, as in claim 1, in which said container can is relatively cup-shaped with its top end initially open;

a metallic cap is disposed at and physically joined to the open end of said container can and electrically insulated therefrom, to close and seal said can;

and means supporting said auxiliary space-defining means from said metallic cap.

7. An electric cell, as in claim 6, in which said means for supporting said auxiliary space-defining means consists of an elongated linear metallic element.

8. An electric cell, as in claim 7, in which said linear metallic element is axially disposed within said cell;

and an anode contact element is disposed to engage and support the anode material in operative position in said cell.

9. An electric cell, as in claim 1, in which said anode terminal assembly consists of a metal disc to serve as an end terminal for the cell, a nail welded coaxially to said disc and having an axially depending shank with a head on its bottom end, a hollow cylindrical metallic cup resting coaxially on said nail head and electrically connected thereto, a hollow cylindrical insulating cup resting within said metallic cup, and a snap ring for engaging the nail shank to lock the insulating cup and the metallic cup against the nail head.

10. An electric cell, as in claim 9, in which said insulating cup has a small section of its wall thinned to be rupturable when the gas pressure within the cell reaches or exceeds a predetermined value.

11. An electric cell, as in claim 9, in which the anode material of the cell surrounds said anode terminal assembly and engages said cylindrical metallic cup which serves as a current collector to said nail for conduction to said metallic disc as a cell electrode terminal.

12. An electric cell, as in claim 2, in which said retarding material is a cellulose material.

13. An electric cell, as in claim 3, in which said barrier material is a cellulose material.

14. An electric cell, as in claim 13, in which said auxiliary space is arranged and disposed to have a passage of maximum dimension in a specific direction, and said passage at its forward end communicates with space outside the cell through a small vent hole;

and said rupturable divider is positioned at the back or upstream end of said path so the retarding material is effective along its whole length in the auxiliary space to slow down and depress the pressured gas forced into said auxiliary space.

15. An electric cell, as in claim 1, in which means are provided to cooperate with said rupturable divider to establish a pressure gradient in a predetermined path through said cell, with means disposed along said path to control gas pressure and electrolyte movement injected into said path through said rupturable divider.

16. An electric cell, as in claim 12, in which said retarding material is cotton.

17. An electric cell, as in claim 13, in which said barrier material is cotton.

* * * * *